July 14, 1970   H. P. FOCHLER ET AL   3,520,019
SLITTING APPARATUS
Filed Oct. 10, 1967

INVENTORS
HELMUT P. FOCHLER
FERNANDO V. GUERRERO
BY
William A. Mikesell Jr.
ATTORNEY United States Patent Office 3,520,019
Patented July 14, 1970

3,520,019
SLITTING APPARATUS
Helmut P. Fochler, Chagrin Falls, and Fernando V. Guerrero, Solon, Ohio, assignors to Continental Oil Company, Ponca City, Okla., a corporation of Delaware
Filed Oct. 10, 1967, Ser. No. 674,338
Int. Cl. B29d 7/00
U.S. Cl. 18—2       1 Claim

ABSTRACT OF THE DISCLOSURE

Apparatus for slitting and smoothing plastic article such as pipe, wherein slit edges are heat softened to allow smoothing.

---

This invention relates to apparatus for effecting longitudinal slitting of a closed elongated thermoplastic object. In one aspect, the invention comprises apparatus for slitting or cutting one wall of a longitudinal object such as a plastic pipe, and for smoothing the edges of the cut.

Many elongated thermoplastic articles, such as rain guttering and guy wire guards, can be conveniently produced by extruding in the form of a "closed" figure, e.g. a pipe, and subsequently splitting or cutting the pipe longitudinally. However, the cut edges are rough and may have splinters, so as to be unsatisfactory as a finished product.

It is accordingly an object of this invention to provide means for cutting and smoothing a longitudinal opening in an elongated thermoplastic object. Other aspects, objects, and the several advantages of the present invention will become apparent upon study of this disclosure and the appended claims, including the drawing, in which:

According to the invention, an elongated thermoplastic object of closed cross-sectional configuration such as a pipe is first cut or slit through one wall thereof in an axial direction, and the two cut edges are then heat-softened so as to effect a smoothing of the cut edges.

Figure 1:
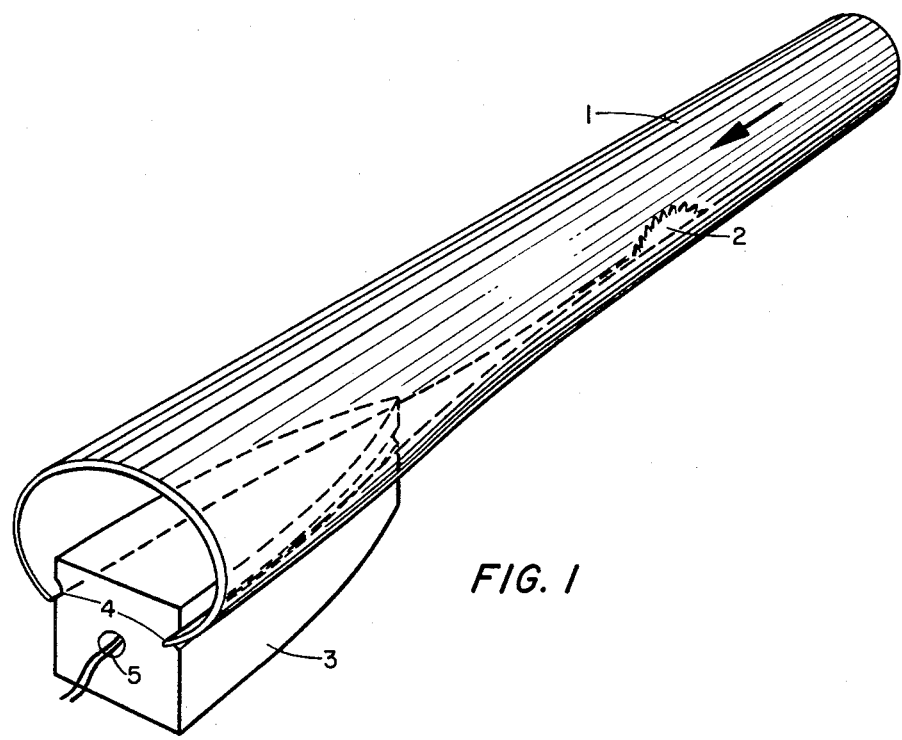
FIG. 1 is a schematic view of one embodiment of this invention.
Figure 2:
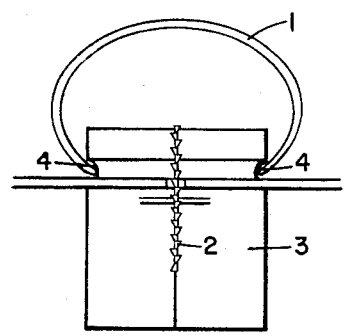
FIG. 2 is an end elevation of a means adapted to effect the invention.

The invention will be more clearly understood by referring to the drawing. In FIG. 1, there is shown an elongated thermoplastic article of closed cross-sectional configuration, 1, such as a plastic pipe. The pipe is preferably treated according to the present invention just after it has issued from an extruder device, as shown in the art, and has been cooled sufficiently to be self supporting. A typical pipe extrusion installation will also include a pulling device, such as powered rollers, to prevent distortion of the soft extrudate. The present invention also preferably follows such a pulling device.

The formed object, such as pipe 1, is cut longitudinally through one wall, as by a circular saw 2, of which only an arc of the blade is shown. The slit pipe is then passed over a heating and forming block, indicated generally as 3. In one embodiment, block 3 comprises an elongated wedge-shaped block of a metal or other material having good heat conductivity properties. This wedge-shaped block is provided with a pair of opposed grooves along the wedge faces, the grooves being indicated as 4. The block is also provided with heating means 5, such as an electric resistance cartridge heater.

In operation, the pipe is moved in an axial direction as indicated by the arrow in FIG. 1, so that one of its walls is cut through longitudinally by saw 2. The pipe is then directed toward the grooves in the pointed end of block 3. A pipe of circular configuration and of stiff or resilient material will tend to retain its configuration, but as it is moved relative to wedge-shaped block 3, it will be opened up. This causes the cut edges of pipe 1 to conform closely to grooves 4, maintaining good thermal contact. Block 3 is heated by heater 5, with the result that the cut edges of the pipe are softened and tend to assume a smooth, semi-circular configuration. After suitable cooling, as by air or by water spray or bath, the softened edges cool to a smooth condition.

According to a second embodiment of the invention, heater block 3 can be provided with an additional heating means (not shown) on its top. This second heater functions to slightly soften the entire internal periphery of the pipe, sufficiently to allow the pipe to retain its spread configuration upon cooling. This second heater can soften the internal wall by radiant, conductive or convective heat, but in one embodiment comprises merely an enlargement of the top of block 3 having the desired final cross-sectional spread configuration, and operated at a slightly lower temperature than are grooves 4.

After the slit and smoothed pipe has cooled sufficiently, it can be cut into lengths as desired.

Several points are worthy of additional consideration in conjunction with the present invention. First, although the invention has been illustrated as treating a cylindrical pipe, it is obvious that other closed geometrical configuration can be treated. For example, "square" rain guttering can be made by the process of this invention by extruding a square or rectangular conduit, cutting out one wall as by a pair of saws side-by-side, and smoothing the cut edges by the present invention. The wall which is removed by cutting can, of course, be returned as scrap to the extrusion. Although the cutting or slitting has been illustrated by a conventional circular saw, it is obvious that other cutting means, such as a heated knife or a reciprocating (saber) saw are permissive.

Heating and spreading means 3 are illustrated in their preferred embodiment, viz. a wedge-shaped block. However, other means such as a pair of heated grooved rollers, such as pulleys or sheaves, preferably provided with a fixed wedge-shaped nosing to ease the slit pipe onto the pulley grooves, can be used. The heating of block 3 can be effected in any desired manner, such as by electrical resistance, gas burner, etc. Also, although it is preferred to move the plastic pipe relative to a fixed cutter 2 and heater 3, it is obvious that the plastic pipe can be held in a fixed position, as by a jig, with the cutter and heating block being moveable.

Heating block 3 is so designed that it will soften the cut edges of the pipe and allow them to be smoothed by the surface tension of the softened plastic, but will not heat the plastic enough to allow it to melt and flow. This control can be achieved in several manners, as by adjusting the length of heating block 3 which contacts the plastic pipe, by controlling the temperature of heater 3, or by controlling the speed of the plastic pipe past the heater.

Reasonable variation and modification are possible within the scope of the foregoing disclosure:

What is claimed is:

1. A machine for axially slitting and smoothing the slit edges of an elongated thermoplastic article which comprises cutting means adapted to cut through a wall of said article in combination with means for simultaneously heating and spreading apart the two cut edges of said article, said means for simultaneously heating and spreading comprising:
   (a) a wedge-shaped block of thermally conductive material having a pair of longitudinal grooves in the wedged faces thereof, and
   (b) means for heating said block.

References Cited

UNITED STATES PATENTS

| 1,098,671 | 6/1914 | Lundy | 83—105 |
| 1,435,659 | 11/1922 | Roberts. | |
| 3,426,111 | 2/1969 | Simpson. | |
| 3,436,442 | 4/1969 | Saks. | |

WILLIAM J. STEPHENSON, Primary Examiner

U.S. Cl. X.R.

83—105; 25—105